United States Patent
Bollay

(10) Patent No.: US 8,306,036 B1
(45) Date of Patent: Nov. 6, 2012

(54) METHODS AND SYSTEMS FOR HIERARCHICAL RESOURCE ALLOCATION THROUGH BOOKMARK ALLOCATION

(75) Inventor: Benn Bollay, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 450 days.

(21) Appl. No.: 12/174,262

(22) Filed: Jul. 16, 2008

Related U.S. Application Data

(63) Continuation of application No. 12/143,411, filed on Jun. 20, 2008, now abandoned.

(51) Int. Cl.
*H04L 12/28* (2006.01)
(52) U.S. Cl. .................................. 370/395.41; 370/468
(58) Field of Classification Search .................. 370/468, 370/395.41; 709/226
See application file for complete search history.

(56) References Cited

U.S. PATENT DOCUMENTS

| | | | |
|---|---|---|---|
| 5,761,534 | A | 6/1998 | Lundberg et al. |
| 5,828,835 | A | 10/1998 | Isfeld et al. |
| 5,941,988 | A | 8/1999 | Bhagwat et al. |
| 6,026,443 | A | 2/2000 | Oskouy et al. |
| 6,115,802 | A | 9/2000 | Tock et al. |
| 6,529,508 | B1 | 3/2003 | Li et al. |
| 6,700,871 | B1 | 3/2004 | Harper et al. |
| 6,748,457 | B2 | 6/2004 | Fallon et al. |
| 6,781,990 | B1 | 8/2004 | Puri et al. |
| 6,820,133 | B1 | 11/2004 | Grove et al. |
| 7,065,630 | B1 | 6/2006 | Ledebohm et al. |
| 7,107,348 | B2 | 9/2006 | Shimada et al. |
| 7,142,540 | B2 | 11/2006 | Hendel et al. |
| 7,236,491 | B2 | 6/2007 | Tsao et al. |
| 7,281,030 | B1 | 10/2007 | Davis |
| 7,324,525 | B2 | 1/2008 | Fuhs et al. |
| 7,355,977 | B1 | 4/2008 | Li |
| 7,376,772 | B2 | 5/2008 | Fallon |
| 7,403,542 | B1 | 7/2008 | Thompson |
| 7,420,931 | B2 | 9/2008 | Nanda et al. |
| 7,478,186 | B1 | 1/2009 | Onufryk et al. |
| 7,496,695 | B2 | 2/2009 | Go et al. |
| 7,500,028 | B2 | 3/2009 | Yamagishi |

(Continued)

FOREIGN PATENT DOCUMENTS

EP 1813084 A1 8/2007

(Continued)

OTHER PUBLICATIONS

"Cavium Networks Product Selector Guide—Single & Multi-Core MIPS Processors, Security Processors and Accelerator Boards," 2008, pp. 1-44, Cavium Networks, Mountain View, CA, US.

(Continued)

*Primary Examiner* — Sai-Ming Chan
(74) *Attorney, Agent, or Firm* — LeClairRyan, a Professional Corporation

(57) ABSTRACT

Methods and systems for efficient allocation of resources between child nodes of a parent node in a hierarchical system. The parent node has a limited number of resources available in a resource allocation phrase. The limited number of resources are allocated according to requests from the child nodes in the resource allocation phase. It is determined whether at least one of the child nodes has a request not met by the allocated resources. A bookmark associated with the child node is set for the additional required resources. Additional resources are allocated to the child node according to the bookmark in a subsequent resource allocation phase.

15 Claims, 5 Drawing Sheets

U.S. PATENT DOCUMENTS

| | | | |
|---|---|---|---|
| 7,512,721 | B1 | 3/2009 | Olson |
| 7,533,197 | B2 | 5/2009 | Leonard et al. |
| 7,558,910 | B2 | 7/2009 | Alverson et al. |
| 7,571,299 | B2 | 8/2009 | Loeb |
| 7,647,416 | B2 | 1/2010 | Chiang et al. |
| 7,657,659 | B1 | 2/2010 | Lambeth et al. |
| 7,668,727 | B2 | 2/2010 | Mitchell et al. |
| 7,668,851 | B2 | 2/2010 | Triplett |
| 7,729,239 | B1 | 6/2010 | Aronov et al. |
| 7,735,099 | B1 | 6/2010 | Micalizzi, Jr. |
| 7,742,412 | B1 | 6/2010 | Medina |
| 7,784,093 | B2 | 8/2010 | Deng et al. |
| 7,826,487 | B1 | 11/2010 | Mukerji et al. |
| 7,877,524 | B1 | 1/2011 | Annem et al. |
| 7,916,728 | B1 | 3/2011 | Mimms |
| 8,006,016 | B2 | 8/2011 | Muller et al. |
| 8,103,809 | B1 | 1/2012 | Michels et al. |
| 8,112,491 | B1 | 2/2012 | Michels et al. |
| 2003/0067930 | A1 | 4/2003 | Salapura et al. |
| 2003/0204636 | A1 | 10/2003 | Greenblat et al. |
| 2004/0202161 | A1 | 10/2004 | Stachura et al. |
| 2004/0249948 | A1 | 12/2004 | Sethi et al. |
| 2004/0267897 | A1* | 12/2004 | Hill et al. ............... 709/217 |
| 2005/0007991 | A1* | 1/2005 | Ton et al. ............... 370/349 |
| 2005/0083952 | A1 | 4/2005 | Swain |
| 2005/0114559 | A1 | 5/2005 | Miller |
| 2005/0175014 | A1* | 8/2005 | Patrick ............... 370/395.43 |
| 2006/0007928 | A1 | 1/2006 | Sangillo |
| 2006/0104303 | A1 | 5/2006 | Makineni et al. |
| 2006/0221832 | A1 | 10/2006 | Muller et al. |
| 2006/0221835 | A1 | 10/2006 | Sweeney |
| 2006/0235996 | A1* | 10/2006 | Wolde et al. ............... 709/238 |
| 2006/0288128 | A1 | 12/2006 | Moskalev et al. |
| 2008/0126509 | A1 | 5/2008 | Subramanian et al. |
| 2008/0184248 | A1* | 7/2008 | Barua et al. ............... 718/104 |
| 2009/0003204 | A1 | 1/2009 | Okholm et al. |
| 2009/0016217 | A1 | 1/2009 | Kashyap |
| 2009/0222598 | A1 | 9/2009 | Hayden |
| 2009/0248911 | A1 | 10/2009 | Conroy et al. |
| 2010/0082849 | A1 | 4/2010 | Millet et al. |
| 2010/0094945 | A1 | 4/2010 | Chan et al. |

FOREIGN PATENT DOCUMENTS

| | | |
|---|---|---|
| WO | WO 2006/055494 A1 | 5/2006 |

OTHER PUBLICATIONS

"Chapter 15, Memory Mapping and DMA," Memory Management in Linux, ch15.13676, accessed on Jan. 25, 2005, pp. 412-463.

"Comtech AHA Announces 3.0 Gbps GZIP Compression/Decompression Accelerator AHA362-PCIX offers high-speed GZIP compression and decompression," www.aha.com, Apr. 20, 2005, pp. 1-2, Comtech AHA Corporation, Moscow, ID, USA.

"Comtech AHA Announces GZIP Compression and Decompression IC Offers the highest speed and compression ratio performance in hardware on the market," www.aha.com, Jun. 26, 2007, pp. 1-2. Comtech AHA Corporation, Moscow, ID, USA.

"DMA and Interrupt Handling," <http://www.eventhelix.com/RealtimeMantra/FaultHandling/dma_interrupt_handling.htm>, Jan. 29, 2010, pp. 1-4, EventHelix.com.

"Gigabit Ethernet/PCI Network Interface Card; Host/NIC Software Interface Definition," Jul. 1999, pp. 1-80, Revision 12.4.13, P/N 020001, Alteon WebSystems, Inc., San Jose, California.

Harvey et al., "DMA Fundamentals on Various PC Platforms," Application Note 011, Apr. 1999, pp. 1-20. National Instruments Corporation.

"Layer 4/7 Switching and Other Custom IP Traffic Processing using the NEPPI API," Bell Laboratories, Lucent Technologies, pp. 1-11, Murray Hill, NJ. 1999.

Mangino, John, "Using DMA with High Performance Peripherals to Maximize System Performance," WW TMS470 Catalog Applications. SPNA105 Jan. 2007, pp. 1-23.

Mogul, Jeffrey C., "The Case for Persistent-Connection HTTP," SIGCOMM '95, Digital Equipment Corporation Western Research Laboratory, 1995, pp. 1-15, Cambridge, Maine.

"Nitrox™ XL Security Acceleration Modules PCI 3V or 3V/5V-Universal Boards for SSL and IPSec," at http://www.Caviumnetworks.com, 2002, pp. 1, Cavium Networks, Mountain View, CA USA.

"PCI, PCI-X." at http://www.cavium.com/acceleration_boards_PCI_PCI-X.htm (Downloaded Oct. 2008), Cavium Networks—Products > Acceleration Boards > PCI. PCI-X.

"Plan 9 kernel history: overview / file list / diff list," <http://switch.com/cgi-bin/plan9history.cgi?f=2001/0126/pc/etherga620.com>, accessed Oct. 22, 2007, pp. 1-16.

Rabinovich et al., "DHTTP: An Efficient and Cache-Friendly Transfer Protocol for the Web," IEEE/ACM Transactions on Networking, Dec. 2004, pp. 1007-1020. vol. 12, No. 6.

Salchow, Jr., KJ, "Clustered Multiprocessing: Changing the Rules of the Performance Game," F5 White Paper. Jan. 2008, pp. 1-11, F5 Networks, Inc.

Stevens, W., "TCP Slow Start, Congestion Avoidance, Fast Retransmit, and Fast Recovery Algorithms," Network Working Group. RFC 2001, Jan. 1997, pp. 1-6.

"TCP-Transmission Control Protocol (TCP Fast Retransmit and Recovery)," Mar. 28, 2002, pp. 1-5, EventHelix.com.

Wadge, Wallace, "Achieving Gigabit Performance on Programmable Ethernet Network Interface Cards," May 29, 2001, pp. 1-9.

Welch, Von, "A User's Guide to TCP Windows," http://www.vonwelch.com/report/tcp_windows, updated 1996, last accessed Jan. 29, 2010, pp. 1-5.

Wikipedia, "Direct memory access," <http://en.wikipedia.org/wiki/Direct_memory_access>, accessed Jan. 29, 2010, pp. 1-6.

Wikipedia, "Nagle's algorithm," <http://en.wikipedia.org/wiki/Nagle%27s_algorithm>, 2 pages, Oct. 1999.

* cited by examiner

METHODS AND SYSTEMS FOR HIERARCHICAL RESOURCE ALLOCATION THROUGH BOOKMARK ALLOCATION

RELATED APPLICATIONS

This is a continuation application from U.S. Ser. No. 12/143,411 filed Jun. 20, 2008 to the same inventor. That application is hereby incorporated by reference.

FIELD OF THE INVENTION

This invention generally relates to optimizing distribution of resources and more particularly, to a method and systems for optimizing the resource allocation through bookmark based allocation from parent to child nodes.

BACKGROUND

Allocation of resources in a hierarchical system may be accomplished through the use of parent nodes, each of which is coupled to a plurality of child nodes. An example of a hierarchical system is a network that distributes bandwidth resources according to the needs of child nodes through a parent node. With the widespread use of network based applications and the advent of the need to transmit larger amounts of data in different formats such as HTTP for web data and VOIP for audio data, concerns have been raised with unbalanced allocation of resources by parent nodes to child nodes in network allocation of bandwidth resources. Such unbalanced allocations occur when the greater need for certain child nodes results in the denial of resources to other child nodes by the parent node.

In a system such as a network LAN, an appliance that receives traffic from a WAN such as the Internet may be required to distribute limited resources to a variety of different application protocols. The total available resources may be viewed as a parent node. Each of the different application protocols, in the role of child nodes, are coupled to the parent node. Requests received from the child nodes are allocated resources as resources are available to both the children individually, and to the parent node as a system. In a typical system, children do not negotiate with other children to maintain fairness between different applications. The crowding out of resources decreases the service provided by the child nodes that have lower frequencies of resource requests.

One example of a network based appliance that allocates resources is an Internet traffic management device. The Internet traffic management device may be viewed a parent node and may be structured so that child nodes use Internet traffic resources for HTTP services, VOIP services, and CMB/CFIS services. In such a system, the traffic management device has a limited number of tokens representing bandwidth that is allocated to each of the child nodes according to requests during a resource allocation phase. The more resource intensive child nodes such as a VOIP server often crowd out the other child nodes resulting in poor or no service for the other child nodes.

SUMMARY

According to one example, a method is disclosed for a method for allocation of resources between child nodes from a parent node having a limited number of resources available in a resource allocation phrase. The parent node has a limited number of resources available in a resource allocation phrase. The limited number of resources are allocated according to requests from the child nodes in the resource allocation phase. It is determined whether at least one of the child nodes has a request not met by the allocated resources. A bookmark associated with the child node is set for the additional required resources. Additional resources are allocated to the child node according to the bookmark in a subsequent resource allocation phase.

Another example is a machine readable medium having stored thereon instructions for resource allocation in a system having a parent node and a parent node. The stored instructions include machine executable code, which when executed by at least one machine processor, causes the machine to allocate the limited number of resources according to requests from the child nodes in the resource allocation phase. The stored instructions cause the machine to determine whether at least one of the child nodes has a request not met by the allocated resources. The stored instructions cause the machine to set a bookmark associated with the child node for the additional required resources and allocate additional resources to the child node according to the bookmark in a subsequent resource allocation phase.

Another example is a system for efficient allocation of network resources. The system includes a parent node having a limited number of allocated resources. A plurality of child nodes each have a settable bookmark. A source provides resources to the parent node in a resource allocation phase. A network traffic allocation module is interposed between the source and the parent node. The network traffic allocation module allocates the limited number of resources according to requests from the child nodes in the resource allocation phase. The network traffic allocation module determines whether at least one of the child nodes has a request not met by the allocated resources. The bookmark associated with the child node for the additional required resources is set. Additional resources are allocated to the child node according to the bookmark in a subsequent resource allocation phase.

Another example is a traffic management device parent node for interposition between a network and a plurality of child node servers each in communication with the traffic management device parent node for network resources. The traffic management device parent node includes a network interface that receives bandwidth resources from the network and a child interface coupled to the child nodes. A resource allocation module distributes network resources to the plurality of child nodes during allocation phases. The resource allocation module allocates the bandwidth resources according to requests from the child node servers in a resource allocation phase. The module determines whether at least one of the child nodes has a request not met by the allocated resources, reads a bookmark set by the child node for the additional required resources, and allocates additional resources to the child node according to the bookmark in a subsequent resource allocation phase.

Additional aspects will be apparent to those of ordinary skill in the art in view of the detailed description of various embodiments, which is made with reference to the drawings, a brief description of which is provided below.

Figure 1A:
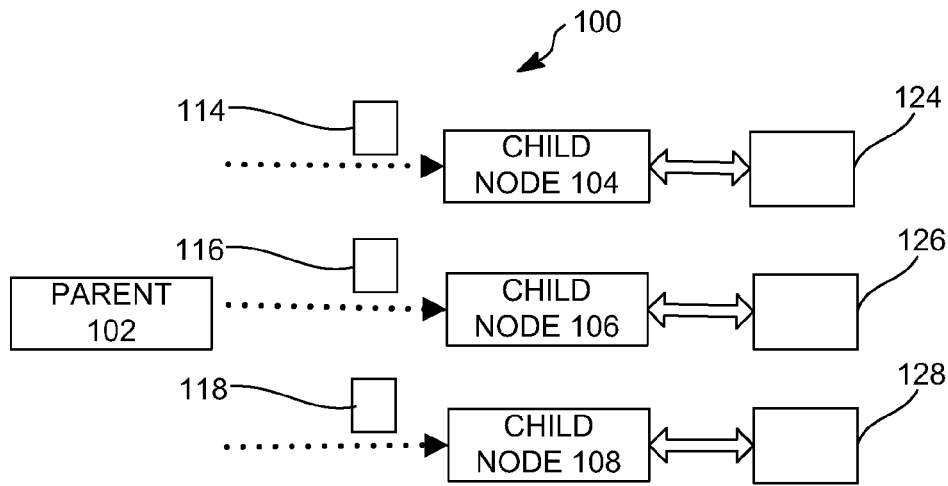
FIGS. 1A-1D are block diagrams of an example hierarchical system having a parent node and child nodes that allows for balanced allocation of resources.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Currently, the ability to guarantee minimal levels of service among resource competitive child nodes from limited resources provided from a parent node is impeded by the crowding out of lower resource child nodes by resource intensive child nodes. The result is that the lower resource child nodes are denied resources from the parent node resulting in a decline in service.

FIG. 1A is a block diagram of an example hierarchical system 100 that may allow for efficient data transmission using allocation of resources. The system 100 may have a parent node 102 and a set of child nodes 104, 106 and 108. The child nodes 104, 106 and 108 may be allocated a limited number of resources from the parent node 102 in a resource allocation phase. The child nodes 104, 106 and 108 may each set corresponding bookmarks 114, 116 and 118 signifying the need for additional required resources in subsequent resource allocation phases. In this example, each of the child nodes may have a respective counter 124, 126 and 128 that record the number of resources allocated to the child node. The limited number of resources may be allocated by the parent node 102 according to requests from the child nodes in a first resource allocation phase. It may be determined whether at least one of the child nodes 104, 106 or 108 has a request not met by the allocated resources in that resource allocation phrase. The bookmark such as the bookmark 114 may be set by the respective child node such as the child node 104 for the additional required resources. Future resources in the next resource allocation phase may then be allocated to the child nodes setting their respective bookmarks according to a pre-determined allocation scheme.

Figure 1B:
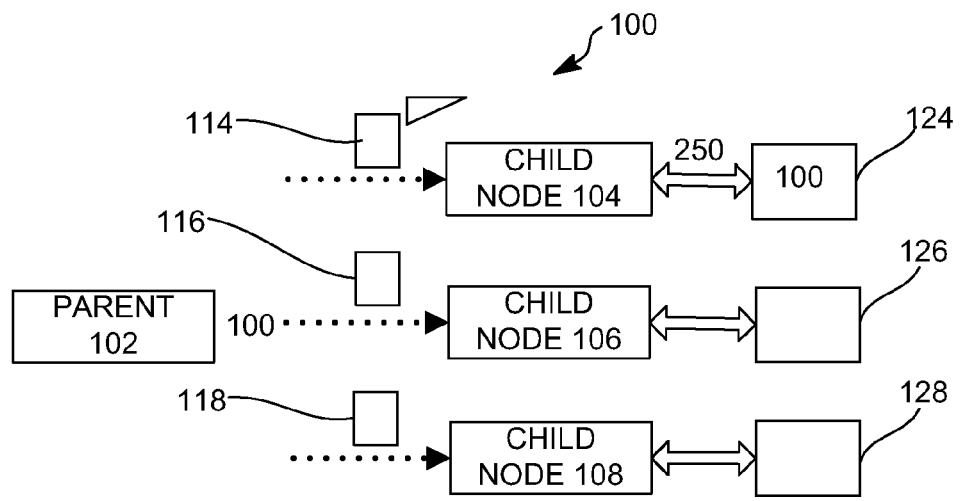

FIG. 1B shows the system 100 where the parent node 102 may have a limited number of 100 resource units (bucket of tokens) in a first resource allocation phase. The child node 104 may have requested 250 resource units (tokens) in this example. The counter 124 may be set to 100 resource units representing the maximum resource units (tokens) that could be allocated to the child node 104. The parent node 102 may allocate all of the 100 resource units to the child node 104 because it is the only child node that requested resources. The counter 124 associated with the child node 104 may be decremented by 100 resource units and since the counter 124 is now at zero, the child node 104 will have to wait for subsequent resource allocation phases to receive the 150 resource units to complete the action. The child node 104 may thus set the associated bookmark 114 for 150 resource units.

Figure 1C:
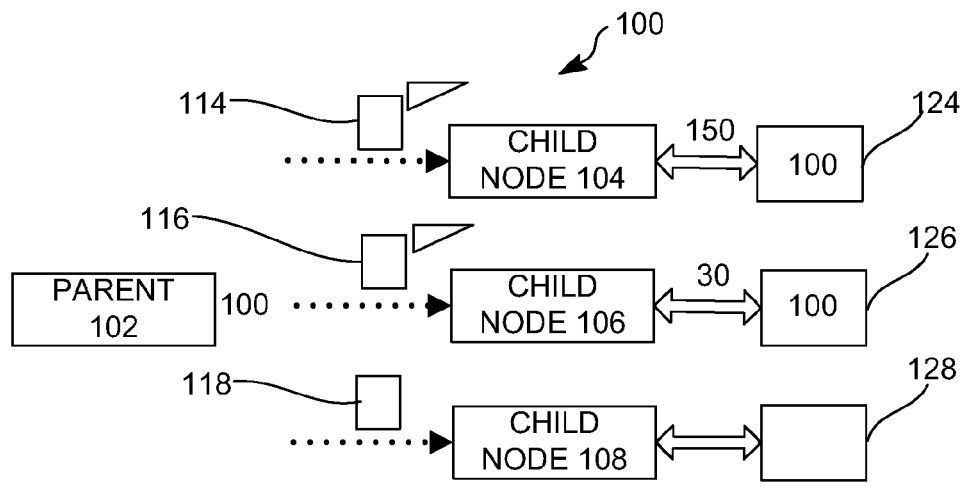

In the next resource allocation phase, as shown in FIG. 1C, the child node 106 may have made a request for 30 resource units and set the associated bookmark 116 for 30 resource units. The parent node 102 then may use an allocation scheme to allocate the 100 available resource units between the child nodes 104 and 106 during the next resource allocation phase. In this example, the allocation scheme may be a prioritization scheme that ensures that 30 resource units are allocated to the child node 106 (having a higher priority) while the remaining 70 resource units are allocated to the child node 104 leaving the need for 80 additional resource units. The child node 106 in this example may decrement the respective counter 126 leaving 70 remaining in the counter 126. This indicates to the child node 106 that the necessary resources have been allocated to the child node 106. The child node 106 may then clear the associated bookmark 126. In this manner, the request of the child node 106 is not crowded out by the on-going request of the child node 104 in the resource allocation phase.

Figure 1D:
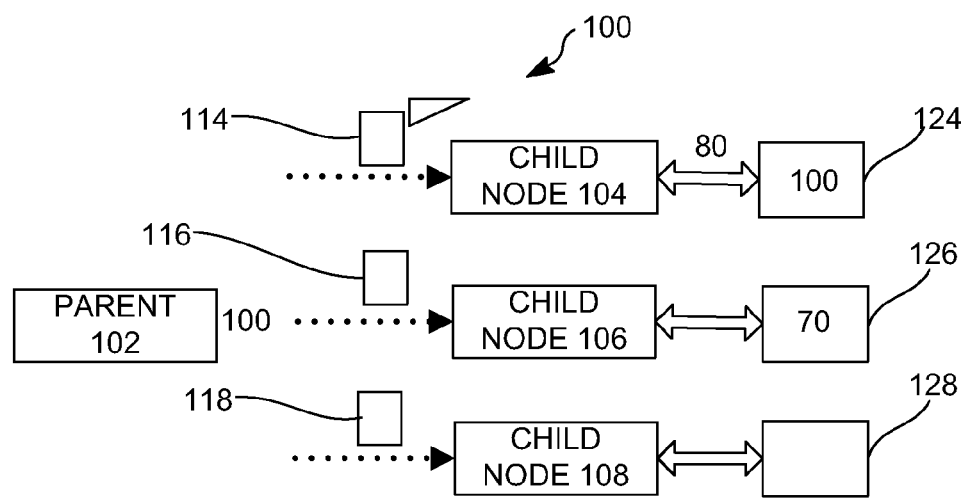

FIG. 1D shows the system 100 at the end of the next resource allocation phase in FIG. 1C. The child node 104 again may decrement the counter 124 to zero to indicate that additional resources are required. The bookmark 114 may remain in place to indicate the need for additional resources for the child node 104 as shown in FIG. 1D. The child node 106 has cleared the bookmark 116 since the needed resources have been allocated in the previous resource allocation phase. The bookmark 114 is still set by the child node 104 to indicate the need for an additional 80 resource units. In the next resource allocation phase, the parent node 102 may allocate 80 resource units of the available 100 resource units to the child node 104. The child node 104 may then complete its action in this resource allocation phase when it receives the remaining 80 resource units. Accordingly, the child node 104 may clear the bookmark 114.

As shown above, by using the bookmark scheme in FIGS. 1A-1D, each single child node may be guaranteed equality against other child nodes during resource allocation phases. The system 100 may use token buckets (resources), where each child node consumes against a ceiling token bucket (resource limit) and against all of the parent node's token ceilings. When the parent node's ceiling has been reached, the child node may leave the bookmark set for the parent node such as the bookmark 114 associated with the child node 104 in FIG. 1B. During the resource allocation phase, the parent node 102 looks at the available bookmarks from the child nodes 104, 106 and 108. The parent node 102 divides the resource tokens available for the resource allocation phase to the child nodes with bookmarks by an appropriate allocation scheme. Further ceiling calculations on the part of the child node against the parent node take into account both the inherent ceiling of the parent node 102 and bookmarked amount that the child node has representing the needed resources for the child node. Once the resources are no longer needed, the bookmark is dropped.

The allocation of resources according to the bookmarks may be made according to a scheme such as by equal distribution between the child nodes. Alternatively, the allocation may be made according to the importance of the child nodes. As shown in the above example, the child node 106 was prioritized in importance and therefore received proportionally more resources from the parent node 102 during the resource allocation phase. Another scheme may include weighting according to the relative proportion of needed resources for each child node. Intelligent prioritization may therefore be made via the allocation scheme dictating resource allocation by the parent node to the child nodes.

One example of resources may be the allocation of tokens representing network traffic resources on a reliable delivery communication standard such as a Transmission Control Protocol/Internet Protocol (TCP/IP) based network. The allocation of tokens for necessary bandwidth to perform operations may be requested by each child node to the parent node. In this example, the parent node may be a network traffic device that has a limited number of tokens representing bandwidth of a WAN during each predetermined time period. Another example may be for a network based on an unreliable delivery communication standard such as User Datagram Protocol/Internet Protocol (UDP/IP).

In such an example, each child node may request bandwidth for a different IP-based protocol application such as SMTP for e-mail, HTTP/SSL for Internet applications, SOAP for Internet applications, and VOIP for voice. The methods described herein provide optimal bandwidth utilization in conjunction with other traffic management functions.

Figure 2:
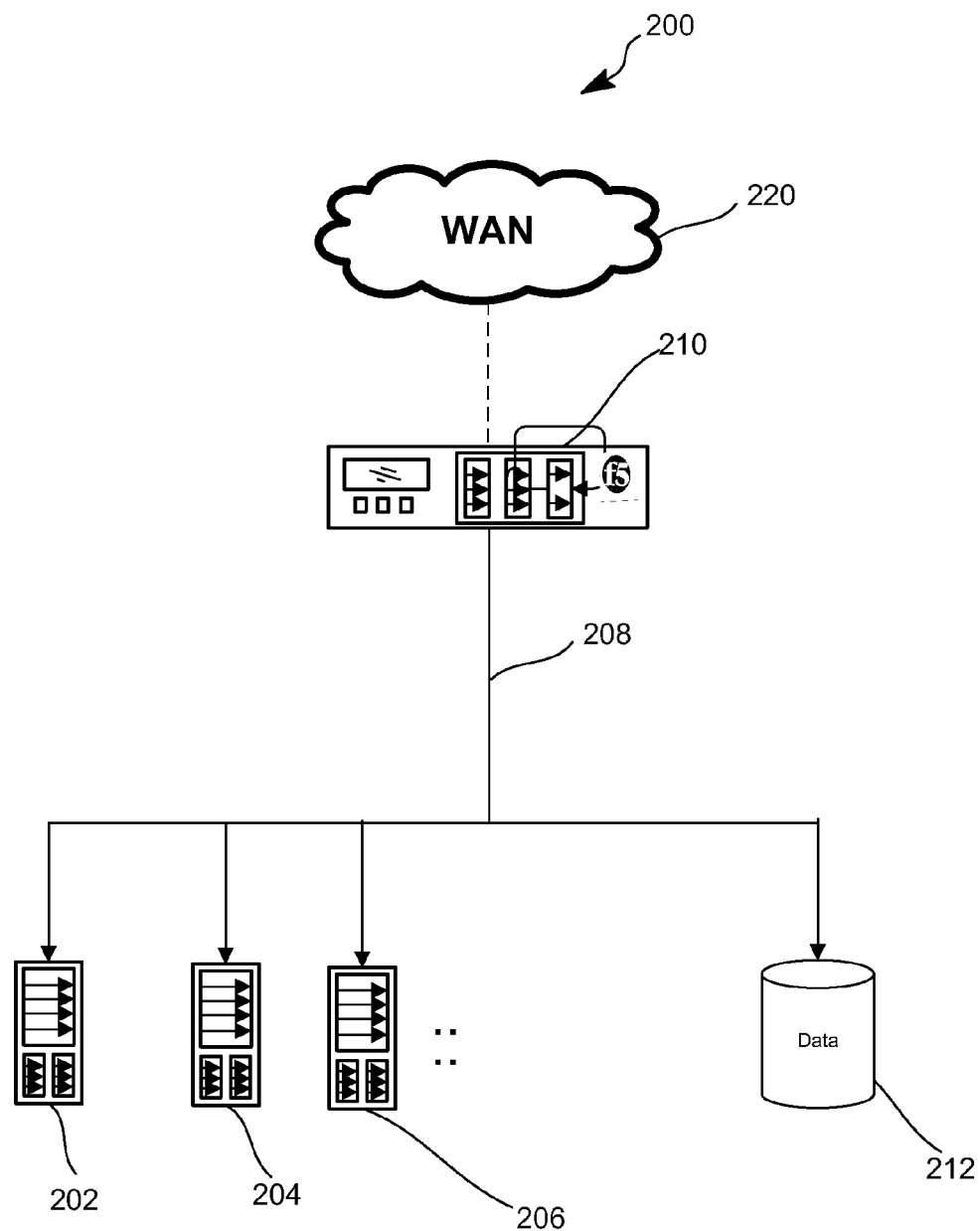
FIG. 2 is a block diagram of an example system including a traffic management device that behaves as a parent node for transmission resources and server child nodes to allow balanced resource allocation of the transmission resources.

FIG. 2 shows a network system 200 that may include a series of one or more application servers 202, 204 and 206 and at least one traffic management device 210 in a private network 208. The private network 208 may also include other devices such as a storage device 212. In this example, the traffic management device 210 is logically interposed between the application servers 202, 204 and 206 in the private network 208, although other arrangements may be used in other network environments. It is to be understood that the servers 202, 204 and 206 may be hardware or software or may represent a system with multiple servers which may include internal networks. In this example the servers 202, 204 and 206 may be any version of Microsoft® IIS servers or Apache® servers, although other types of servers may be used. Further, additional servers may be coupled to the system 200 and many different types of applications may be available on servers coupled to the system 200.

In this example, the traffic management device 210 may be the WANJET® traffic management appliance available from F5 Networks, Inc. of Seattle, Wash., although other traffic management devices could be used. Alternatively, the resource allocation methods and systems described herein may be used in other devices with network traffic management functionality such as the BIG-IP® products available from F5 Networks, Inc. of Seattle, Wash. As will be explained below, the resource allocation methods and systems described herein may also be used entirely internally or partly internally on a device such as a server or a client computer. The methods and system below may also be used with traffic management devices on other types of networks. Additionally, any other system or device which is required to distribute resources in a hierarchical manner may use this algorithm. Examples of such systems may include, but are not limited to, memory allocation systems, storage allocation systems, processor based resource allocation systems such as single or multi-core systems.

The traffic management device 210 may provide a connection to a wide area network (WAN) 220 and manages traffic to and from the wide area network 220. The wide area network 220 may include any publicly accessible network environment, such as the Internet, which includes network components, such as public servers that are not directly managed or under direct control by the traffic management device 210, yet whose operation may still be influenced in unique, novel and unexpected ways in response to TCP/IP protocol directives strategically purposefully determined and sent from the traffic management device 210 to make the private network 208, and perhaps the wide area network 220, operate more efficiently, as will be described in greater detail herein. It should be noted, however, that the ensuing descriptions of the various functionalities relating to the private servers 202, 204 and 206 are generally applicable to the network devices coupled to the wide area network 220, and thus the remaining description will simply refer to either one as servers 202, 204 and 206 unless noted otherwise.

In this example, the private network 208 may be a local area network (LAN) environment employing any suitable interface mechanisms and communications technologies including, for example telecommunications in any suitable form (e.g., voice, modem, and the like), Public Switched Telephone Network (PSTNs), Ethernet based Packet Data Networks (PDNs), combinations thereof, and the like. Moreover, private network 208 may be made up of one or more interconnected LANs located in substantially the same geographic location or geographically separated, although the network 208 may include other types of networks arranged in other configurations. Moreover, the private network 208 may include one or more additional intermediary and/or network infrastructure devices in communication with each other via one or more wired and/or wireless network links, such as switches, routers, modems, or gateways (not shown), and the like, as well as other types of network devices including network storage devices.

The traffic management device 210 may be interposed between the servers 202, 204 and 206 and the wide area network 220 as shown in FIG. 2. The traffic management device 210 may act as a parent node such as the parent node 102 in FIG. 1 and provide traffic resources established between the servers 202, 204 and 206 acting as child nodes and the wide area network 220.

From the perspective of the clients of the wide area network 220, they have directly established a connection in the usual way to the appropriate servers 202, 204 and 206 and respective server applications. The existence of a proxy connection may be entirely transparent to a requesting client computer. The implementation of such a proxy may be performed with known address spoofing techniques to assure transparency, although other methods could be used. The traffic management device 210 may provide high availability of IP applications/services running across multiple servers such as the servers 202, 204 and 206. The traffic management device 210 may act as a parent node to distribute requests from the client computers coupled to the wide area network 220 according to business policies, data center conditions and network conditions to ensure availability of the applications running on the servers 202, 204 and 206 in accordance with the resource allocation scheme described above in FIG. 1. The servers 202, 204 and 206 act as child nodes in this example. In this example, the server 202 may handle e-mail requests in SMTP, the server 204 may handle Internet applications in HTTP/SSL, and the server 206 may handle voice applications in VOIP.

For example, the traffic management device 210 acting as a parent node may allocate network bandwidth resources to the servers 202, 204 and 206 according to requests from the servers 202, 204 and 206. In this example, the server 206 may make a request for bandwidth resources for a VOIP application. If the server 202 also makes a request for bandwidth resources for an e-mail application, the respective servers 202 and 206 may set bookmarks indicating the need for resources. The traffic management device 210 may allocate the network bandwidth resources according to a predetermined allocation scheme. In this example, the administrator of the system 200 may give priority to the e-mail traffic and therefore the traffic management device 210 may allocate necessary bandwidth resources to the server 202. In this example, the request for bandwidth resources for the VOIP application by the server 206 may not be sufficient. The server 206 would thus set a bookmark and the traffic management device 210 acting as a parent node would allocate additional bandwidth resources in a future resource allocation phase. This may insure that bandwidth resources are equitably allocated among requesting child nodes such as the servers 202, 204 and 206 and in this example insure a certain level of application service.

Figure 3:
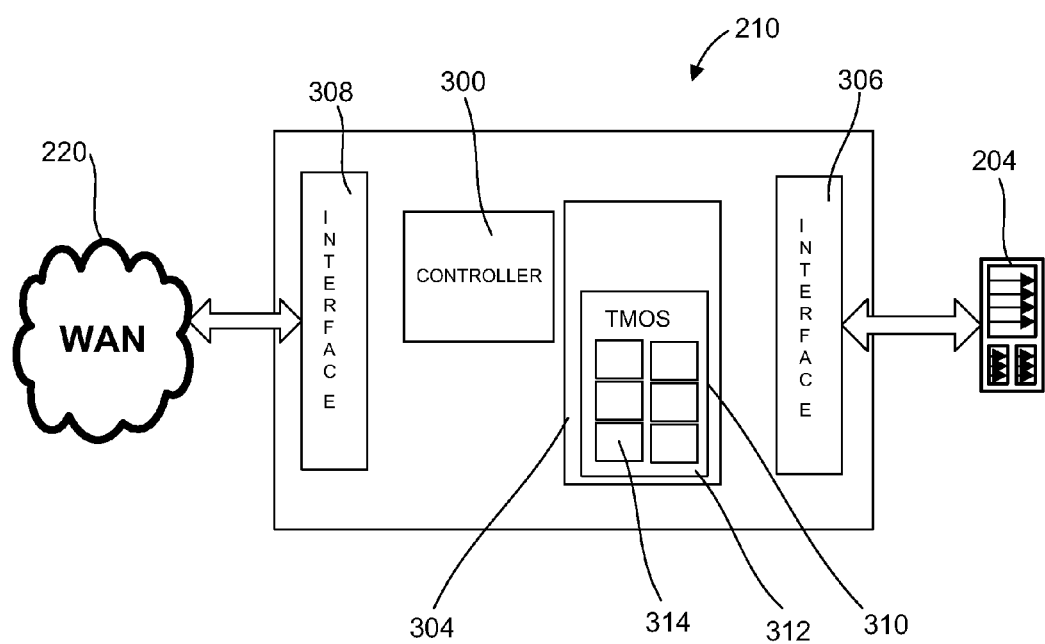
FIG. 3 is a block diagram of the hardware components for the example traffic management device in FIG. 2.

FIG. 3 is a block diagram of the traffic management device 210 in FIG. 2. The traffic management device 210 may include a controller 300, a memory 302, and a client interface 306 that may send responses to and receive requests from clients such as the client servers 202, 204 and 206 through the network 208 in FIG. 2. In this example, the client interface 306 may be an Ethernet connection. The traffic management device 210 may have a wide area network interface 308 that may send requests to and receive responses from the wide area network 220 in FIG. 2.

A traffic management OS 310 may be stored on the memory 302 and may be run by the controller 300. The traffic management OS 310 may have a modular structure with different modules 312 to perform various network traffic management functions. In this example, the modules 312 of the traffic management OS 310 may include a resource allocation module 314 embodying the principles discussed with reference to FIGS. 1A-1D above. The resource allocation module 314 may also run on client computers or servers internally to allocate resources in the manner described in FIG. 1. It is also to be understood that the traffic management OS 310 with the resource allocation module 314 may be operated on any suitable traffic management device.

The traffic management OS 310 features architectural elements of a proxy approach, high-speed performance, modular functionality. The traffic management OS 310 in this example may be customized to the needs of a particular network. An example of the traffic management OS 310 may be the TMOS® platform available from F5 Networks, Inc. of Seattle, Wash., although other traffic management applications could be used. The traffic management OS 310 may provide functions such as performance, security, availability and management. The traffic management OS 310 may provide shared application services such as iRules, rate shaping, resource cloaking, transaction assurance, universal persistence, caching, compression, encryption, authentication, application health monitors and application switching that are run by the application modules 312. The traffic management OS 310 may also provide shared network services including TCP express, protocol sanitization, high performance SSL, DoS and DDos protection, VLAN segmentation, line rate switching, IP packet filtering, dynamic routing, secure network address translation, port mapping and common management framework.

Each of the client computers, servers, and the traffic management device 210 described above may include a central processing unit (CPU), controller or processor, a memory, and an interface system which are coupled together by a bus or other link, although other numbers and types of each of the components and other configurations and locations for the components can be used. The processor in the traffic management device 210 may execute a program of stored instructions for one or more aspects of the methods and systems as described herein, including for increasing data transmission efficiency, although the processor could execute other types of programmed instructions. The memory may store these programmed instructions for one or more aspects of the methods and systems as described herein, including the method for increasing the transmission efficiency, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, may be used for the memory. The user input device may comprise a computer keyboard and a computer mouse, although other types and numbers of user input devices may be used. The display may comprise a computer display screen, such as a CRT or LCD screen by way of example only, although other types and numbers of displays could be used.

Although an example of the traffic management device 210 are described and illustrated herein in connection with FIGS. 2 and 3, each of the computers of the system 200 could be implemented on any suitable computer system or computing device. It is to be understood that the example devices and systems of the system 200 are for exemplary purposes, as many variations of the specific hardware and software used to implement the system 200 are possible, as will be appreciated by those skilled in the relevant art(s).

Furthermore, each of the systems of the system 200 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the systems in the system 200. Accordingly, principles and advantages of distributed processing, such as redundancy, replication, and the like, also can be implemented, as desired, to increase the robustness and performance of the devices and systems of the system 200. The system 200 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

The operation of the example resource allocation module 314, shown in FIG. 3, which may be run on the traffic management device 210, will now be described with reference back to FIG. 1 in conjunction with the flow diagram shown in FIG. 4. The flow diagram in FIGS. 4A-4B is representative of example machine readable instructions for implementing the data transmission process. In this example, the machine readable instructions comprise an algorithm for execution by: (a) a processor, (b) a controller, and/or (c) one or more other suitable processing device(s). The algorithm may be embodied in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the traffic management device 210 could be implemented by software, hardware, and/or firmware. Also, some or all of the machine readable instructions represented by the flowchart of FIG. 4 may be implemented manually. Further, although the example algorithm is described with reference to the flowchart illustrated in FIGS. 4A-4B, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Figure 4A:
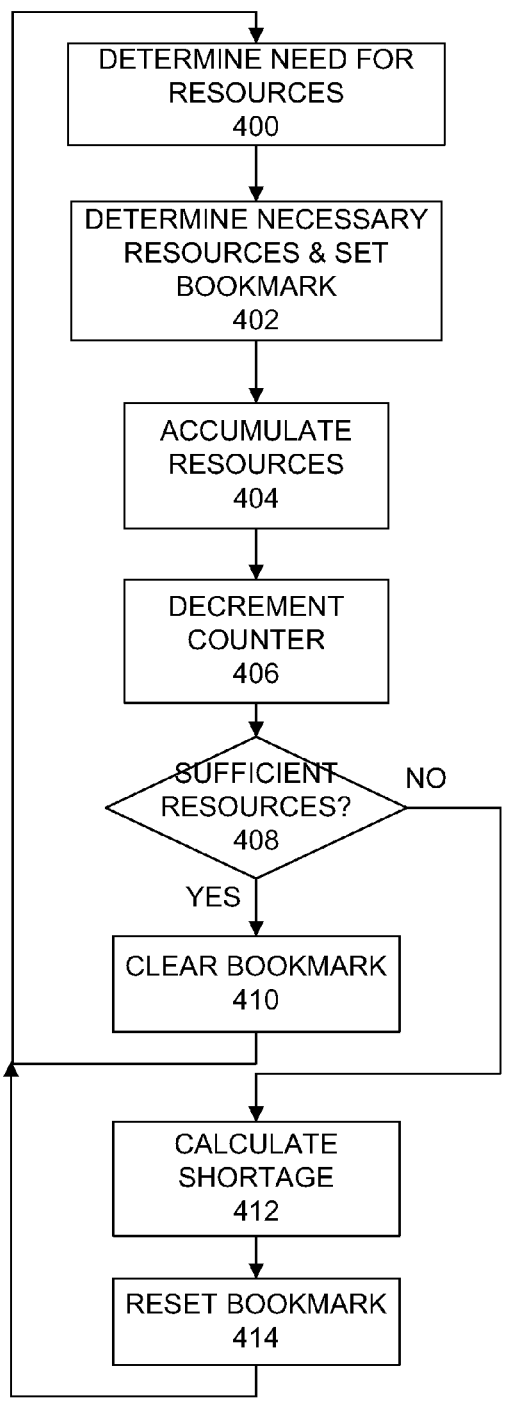
FIGS. 4A-4B is a flow chart of methods for the allocation of resources between parent and child nodes.

FIG. 4A is a flow diagram of the procedure that may be employed by the child nodes, such as the child node 104 in FIG. 1 in resource allocation phases. The child node 104 may first determine the need for resources (400). The child node 104 then may determine the necessary resources available (402). In determining the necessary resources, the child node 104 may check the counter such as the counter 124 and sets the bookmark 114 if additional resources are needed signified by the counter 124 being decremented to zero from a previous resource allocation phase. The child node 104 may then accumulate resources from the parent node 102 (404). The parent node 102 may assign some or all of the available resources to the requesting child node 104 depending on the requests from other child nodes such as the child nodes 106 and 108.

After resources from the resource allocation phase are allocated to the child node 104, the child node 104 may decrement the counter 124 by the resources that were allocated. The child node 104 then determines whether sufficient resources were allocated by determining whether the counter is at zero indicating that insufficient resources were allocated (408). If there were sufficient resources indicating the child node 104 could complete the task, the child node 104 may clear the bookmark 114 (410). If there are insufficient resources (408), the child node 104 may calculate the shortage in resources (412). The required resources determined by this calculation may be used to set the bookmark 114 for the next resource allocation phase (414). The algorithm then cycles back to determine the need for resources in the next resource allocation phase (400).

Figure 4B:
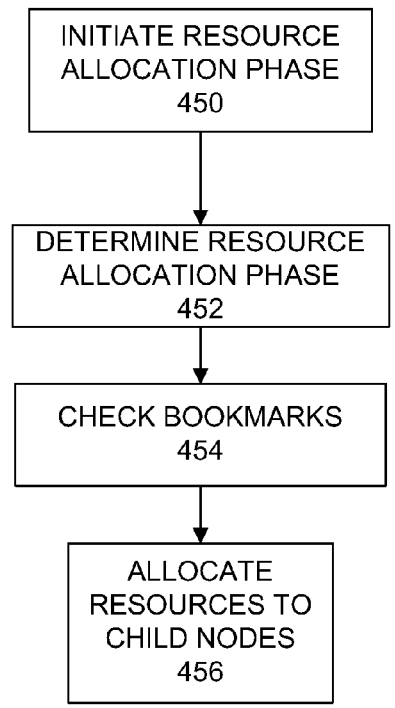

FIG. 4B is a flow diagram of the process that may be followed by the parent node such as the parent node 102 for allocating resources among associated child nodes such as the child node 104 in FIG. 1. The parent node 102 first waits for the initiation of a resource allocation phase (450). The parent node 102 then determines the available resources to it in a resource allocation phase (452). The parent node 102 then may check all bookmarks associated with all of the child nodes (454). If none of the child nodes need resources, there will not be any bookmarks set. If there are bookmarks set, indicating child nodes that need resources, the parent node 102 allocates the resources according to the resource allocation scheme (456). The parent node 102 then returns and waits for the next resource allocation phase (450).

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for allocating resources between child nodes, the method comprising:
    allocating with a traffic management device a limited number of resources of a parent node between child nodes according to requests from the child nodes in a resource allocation phase, wherein the resources comprise tokens representing network bandwidth;
    determining with the traffic management device whether at least one of the child nodes has a request not met by the allocated resources;
    setting with the traffic management device a bookmark associated with the child node and comprising an indication of the additional required resources; and
    allocating with the traffic management device additional resources of the parent node to the child node according to the bookmark in a subsequent resource allocation phase.

2. The method of claim 1, wherein the allocating with the traffic management device additional resources to the child node is determined according to an allocation scheme.

3. The method of claim 2, wherein the allocation scheme is based on at least one of equal distribution between the child nodes, prioritization of the child node, or the relative proportion of requested resources for the child node relative to other child nodes.

4. The method in claim 1, wherein the child nodes are servers using different network communications standards having either reliable or unreliable delivery.

5. The method of claim 4, wherein the different network communications standards are selected from at least one of TCP/IP applications or UDP/IP applications.

6. A non-transitory machine readable medium having stored thereon instructions for allocating resources between child nodes, the stored instructions comprising machine executable code, which when executed by at least one machine processor, causes the processor to perform steps comprising:
    allocating a limited number of resources of a parent node between child nodes according to requests from the child nodes in a resource allocation phase, wherein the resources comprise tokens representing network bandwidth;
    determining whether at least one of the child nodes has a request not met by the allocated resources;
    setting a bookmark associated with the child node and comprising an indication of the additional required resources; and
    allocating additional resources of the parent node to the child node according to the bookmark in a subsequent resource allocation phase.

7. The machine readable medium of claim 6, wherein the additional resources are allocated to the child node according to an allocation scheme.

8. The machine readable medium of claim 7, wherein the allocation scheme is based on at least one of equal distribution between the child nodes, prioritization of the child node, or the relative proportion of requested resources for the child node relative to other child nodes.

9. The machine readable medium of claim 6, wherein the child nodes are servers using different network communication standards having either reliable or unreliable delivery.

10. The machine readable medium of claim 9, wherein the different network communications standards are selected from at least one of TCP/IP applications, or UDP/IP applications.

11. A network traffic management apparatus for allocating resources between child nodes, comprising:
    a network interface for communication with the child nodes;
    a processor coupled to the network interface; and a memory coupled to the processor, wherein the processor is configured to execute programmed instructions stored in the memory comprising:

allocating a limited number of resources of a parent node between child nodes according to requests from the child nodes in a resource allocation phase, wherein the resources comprise tokens representing network bandwidth;

determining whether at least one of the child nodes has a request not met by the allocated resources;

setting a bookmark associated with the child node and comprising an indication of the additional required resources; and allocating additional resources of the parent node to the child node according to the bookmark in a subsequent resource allocation phase.

12. The apparatus of claim 11, wherein the additional resources are allocated to the child node according to an allocation scheme.

13. The apparatus of claim 12, wherein the allocation scheme is based on at least one of equal distribution between the child nodes, prioritization of the child node, or the relative proportion of requested resources for the child node relative to other child nodes.

14. The apparatus of claim 11, wherein the child nodes are servers using different network communication standards having either reliable or unreliable delivery.

15. The apparatus of claim 14, wherein the different network communications standards are selected from at least one of TCP/IP applications or UDP/IP applications.

* * * * *